(12) United States Patent
Krone et al.

(10) Patent No.: US 12,265,398 B2
(45) Date of Patent: Apr. 1, 2025

(54) SELECTIVELY ADJUSTING A POSITION OF AN IMPLEMENT OF A MACHINE BASED ON CHANGES TO A ROLL ANGLE OF A CHASSIS OF THE MACHINE

(71) Applicant: Caterpillar Inc., Peoria, IL (US)

(72) Inventors: Bradley Paul Krone, Dunlap, IL (US); Joseph Leo Faivre, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 300 days.

(21) Appl. No.: 17/806,105

(22) Filed: Jun. 9, 2022

(65) Prior Publication Data

US 2023/0400865 A1 Dec. 14, 2023

(51) Int. Cl.
*G05D 1/00* (2024.01)
*E02F 9/20* (2006.01)

(52) U.S. Cl.
CPC ......... *G05D 1/0891* (2013.01); *E02F 9/2037* (2013.01)

(58) Field of Classification Search
CPC ............................ E02F 9/2037; G05D 1/0891
USPC .......................................................... 701/50
See application file for complete search history.

(56) References Cited

U.S. PATENT DOCUMENTS

| 8,103,417 | B2 * | 1/2012 | Gharsalli | E02F 3/844 |
| | | | | 318/587 |
| 9,328,479 | B1 * | 5/2016 | Rausch | E02F 9/265 |
| 9,347,205 | B2 * | 5/2016 | Kosarev | E02F 3/845 |
| 9,624,643 | B2 * | 4/2017 | Hendron | E02F 3/847 |
| 10,280,590 | B2 * | 5/2019 | Benson | E02F 9/265 |
| 10,876,272 | B2 * | 12/2020 | Faivre | E02F 3/847 |
| 2009/0299546 | A1 * | 12/2009 | Hac | B60R 21/0132 |
| | | | | 701/1 |
| 2013/0158819 | A1 | 6/2013 | Callaway | |
| 2016/0230367 | A1 * | 8/2016 | Hendron | E02F 9/262 |
| 2020/0048863 | A1 * | 2/2020 | Faivre | E02F 3/845 |
| 2021/0191427 | A1 * | 6/2021 | Gunter | G05D 1/0011 |
| 2022/0389678 | A1 * | 12/2022 | Zerbino | E02F 9/264 |

* cited by examiner

*Primary Examiner* — Yazan A Soofi
*Assistant Examiner* — Ahmed Alkirsh

(57) ABSTRACT

A controller may receive a command indicating a target roll angle, of an implement of the machine, relative to a chassis of the machine. The controller may detect a change in a roll angle of the chassis of the machine. The controller may filter the change to pass a low frequency change and remove a high frequency change. The controller may cause the target roll angle to be adjusted based on the low frequency change.

20 Claims, 3 Drawing Sheets

SELECTIVELY ADJUSTING A POSITION OF AN IMPLEMENT OF A MACHINE BASED ON CHANGES TO A ROLL ANGLE OF A CHASSIS OF THE MACHINE

TECHNICAL FIELD

The present disclosure relates generally to controlling an implement of a machine and, for example, to controlling the implement based on a roll angle of a chassis of the machine.

BACKGROUND

A dozer can be used to move material (e.g., dirt) using a blade. As the dozer traverses a terrain, a slope of the terrain may cause changes to a roll angle of a chassis of the dozer. As a result of the changes to the roll angle of the chassis, a roll angle of the blade may change accordingly.

In some instances, an unevenness of a surface of the terrain may cause the roll angle of the chassis to abruptly change. The unevenness may be caused by due to bumps, divots, and/or other irregularities in the terrain. An operator of the dozer may desire to smooth out the surface of the terrain. Accordingly, the operator may adjust a position of the blade to account for abrupt movements of the chassis (e.g., movements occurring over short distances due to the bumps, the divots, and/or the other irregularities in the terrain). For example, the operator may use a joystick of the machine to cause lateral movements of the blade to account for the abrupt lateral movements of the chassis. The operator may take no action with respect to movements of the chassis occurring over longer distances (e.g., movements occurring as a result of gradual changes to a slope of the terrain).

In some situations, the operator may not timely adjust the position of the blade to account for the abrupt lateral movements of the chassis. Alternatively, the operator may excessively adjust the position of the blade. Accordingly, the surface of the terrain may remain uneven and the operator may use the dozer one or more additional times to attempt to smooth out the surface of the terrain. Using the dozer in this manner is time consuming, causes premature wear of components of the dozer, and/or consumes resources associated with using the dozer multiple times to create smoothen the surface of the terrain.

SUMMARY

In some implementations, a method performed by a controller of a machine includes receiving a command indicating a target roll angle, of an implement of the machine, relative to a chassis of the machine; detecting a change in a roll angle of the chassis of the machine; filtering the change to pass a low frequency change and remove a high frequency change; and causing the target roll angle to be adjusted based on the low frequency change.

In some implementations, a system comprises: a controller, associated with a machine, configured to: detect a change in a roll angle of a chassis of the machine; filter the change to pass a low frequency change and remove a high frequency change; adjust a target roll angle, of an implement of the machine, based on filtering the change; and adjust a current roll angle of the implement based on adjusting the target roll angle.

In some implementations, a machine comprises: a chassis; an implement associated with the chassis; and a controller configured to: receive a command indicating a target roll angle, of the implement, relative to the chassis, detect a change in a roll angle of the chassis, determine whether a frequency, associated with the change, satisfies a frequency threshold; and selectively adjust the target roll angle of the implement or prevent the target roll angle from being adjusted based on determining whether the distance satisfies the distance threshold, the target roll angle being adjusted based on determining that the frequency does not satisfy the frequency threshold, and the target roll angle being prevented from being adjusted based on determining that the frequency satisfies the frequency threshold.

DETAILED DESCRIPTION

Figure 1:
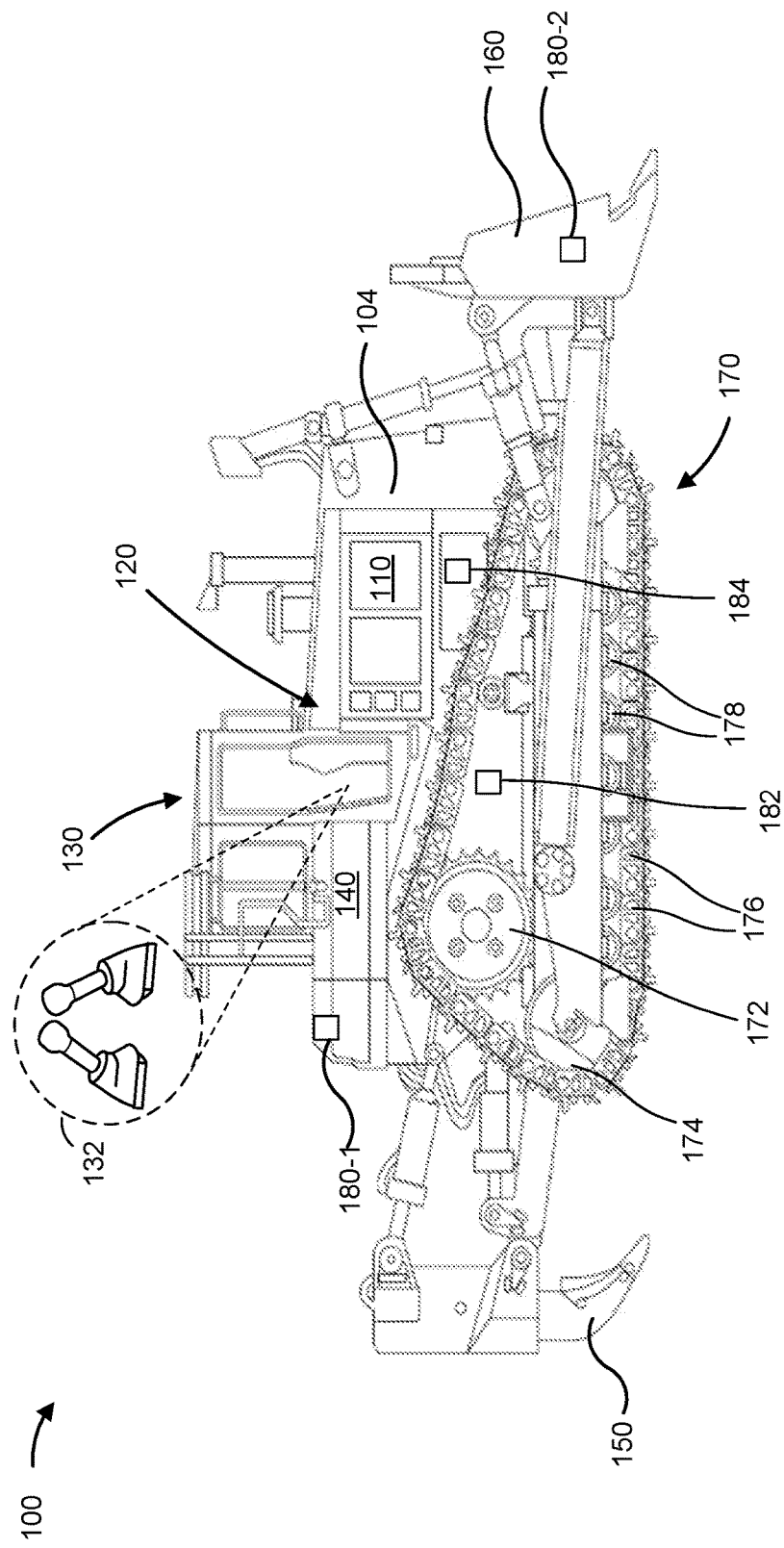
FIG. 1 is a diagram of an example machine described herein.

Some implementations described herein are directed to adjusting a roll angle of an implement of a machine based on filtering changes to a roll angle of a chassis of the machine. For example, unexpected changes (e.g., sudden changes) to the roll angle of the chassis may be discarded and gradual changes to the roll angle of the chassis may be used to adjust the roll angle of the implement of the machine.

The unexpected changes may be referred to as high frequency changes and may be caused by bumps, divots, and/or other irregularities on a terrain. The gradual changes may be referred to as low frequency changes and may be caused by changes to a slope of the terrain. Whether a change to the roll angle of the chassis is a high frequency change or a low frequency change may be determined based on a desired change frequency (or cutoff frequency) and a velocity of the machine (or track speed) during the change.

In some implementations, the changes to the roll angle of the chassis may be filtered using a low pass filter. As an example, the low pass filter may receive as input a first value and a second value. The first value may indicate a change to the roll angle of the chassis over a period of time. The second value may be generated based on a mathematical operation using the desired change frequency and the velocity of the machine. Based on the above-mentioned values, the low pass filter may filter changes to the roll angle of the chassis by removing high frequency components of the roll angle (caused by abrupt/unexpected changes to the terrain) and by passing low frequency components of the roll angle caused by gradual changes to the terrain.

In some examples, a controller (e.g., using the low pass filter) may receive data indicating the roll angle of the chassis over a period of time and may detect a change in the roll angle of the chassis. The controller may adjust the target roll angle of the implement by filtering the roll angle of the chassis by removing a high frequency component of the roll angle of the chassis. The amount of high frequency being rejected may be based on a predefined cutoff frequency. The target roll angle may be determined based on operator control data (from operator controls of the machine) indicating a roll angle, of the implement, desired by an operator of the machine.

In some situations, the controller may prevent a target roll angle of the implement from being adjusted based on removing the high frequency component (e.g., caused by a sudden change). Alternatively, the controller may cause the target roll angle of the implement to be adjusted based on passing the low frequency component (e.g., caused by a gradual change).

Based on the foregoing, the low pass filter may filter changes to the roll angle of the chassis by removing unexpected changes to the roll angle of the chassis and by passing gradual changes to the roll angle of the chassis caused by gradual changes to the terrain. As the controller detects that the roll angle of the chassis gradually changes, the controller may cause the target roll angle of the implement to be adjusted accordingly. For example, if the roll angle of the chassis increases by five degrees, the controller may cause the target roll angle to increase by five degrees. Alternatively, if the roll angle of the chassis decreases by five degrees, the controller may cause the target roll angle to decrease by five degrees.

The controller may generate a command to adjust a current roll angle of the implement based on the adjusted target roll angle. For example, the current roll angle of the implement may be adjusted if the current roll angle is different than the adjusted target roll angle. For example, the controller may generate a command to adjust a position of the implement (e.g., to cause lateral movements of the implement) and, thereby, adjust the current roll angle of the implement to the adjusted target roll angle. By adjusting the roll angle of the implement based on removing unexpected changes to the roll angle of the chassis and by using gradual changes to the roll angle of the chassis, the controller may enable the machine to generate a smooth surface for the terrain.

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

FIG. 1 is a diagram of an example machine 100 described herein. As shown in FIG. 1, machine 100 is as an earth moving machine, such as a dozer (or track type tractor). Alternatively, machine 100 may be another type of machine, such as an excavator, or a wheel loader, among other examples.

As shown in FIG. 1, machine 100 includes a chassis 104, an engine 110, a sensor system 120, an operator cabin 130, operator controls 132, a controller 140, a rear attachment 150, a front attachment 160, ground engaging members 170, sprocket 172, one or more idlers 174, one or more track links 176, one or more rollers 178, one or more inertial measurement units (IMUs) 180, a velocity sensor device 182, and a low pass filter 184.

Engine 110 may include an internal combustion engine, such as a compression ignition engine, a spark ignition engine, a laser ignition engine, a plasma ignition engine, and/or the like. Engine 110 provides power to machine 100 and/or a set of loads (e.g., components that absorb power and/or use power to operate) associated with machine 100. For example, engine 110 may provide power to one or more control systems (e.g., controller 140), sensor system 120, operator cabin 130, and/or ground engaging members 170.

Engine 110 can provide power to an implement of machine 100, such as an implement used in mining, construction, farming, transportation, or any other industry. For example, engine 110 may power components (e.g., one or more hydraulic pumps, one or more actuators, and/or one or more electric motors) to facilitate control of rear attachment 150 and/or front attachment 160 of machine 100.

Sensor system 120 may include sensor devices that are capable of generating signals regarding an operation of machine 100. The sensor devices, of sensor system 120, may include a distance sensor device, a load sensor device, a pressure sensor device, a temperature sensor device, a vibration sensor device, among other examples. The distance sensor device may include a global positioning system (GPS) device, an accelerometer, an odometer, among other examples of sensor devices configured to generate signals indicating a distance traveled by machine 100.

Operator cabin 130 includes an integrated display (not shown) and operator controls 132. Operator controls 132 may include one or more input components (e.g., integrated joysticks, push-buttons, control levers, and/or steering wheels) to control an operation of machine 100. For example, operator controls 132 may be used to control an operation of one or more implements of machine 100 (e.g., rear attachment 150 and/or front attachment 160) and/or control an operation of ground engaging members 170.

For an autonomous machine, operator controls 132 may not be designed for use by an operator and, rather, may be designed to operate independently from an operator. In this case, for example, operator controls 132 may include one or more input components that provide an input signal for use by another component without any operator input.

Controller 140 (e.g., an electronic control module (ECM)) may control and/or monitor operations of machine 100 (e.g., control movement of front attachment 160). For example, controller 140 may control and/or monitor the operations of machine 100 based on signals from operator controls 132, from sensor system 120, from IMUs 180, velocity sensor device 182, and/or from low pass filter 184, as described in more detail below.

Rear attachment 150 may include a ripper assembly, a winch assembly, and/or a drawbar assembly. Front attachment 160 may include a blade assembly. Front attachment 160 and/or rear attachment 150 may be referred to as implements of machine 100. Ground engaging members 170 may be configured to propel machine 100. Ground engaging members 170 may include wheels, tracks, rollers, and/or similar components, for propelling machine 100. Ground engaging members 170 may include an undercarriage that includes tracks (as shown in FIG. 1). The tracks may include track links 176.

Sprocket 172 may include one or more sprocket segments. Sprocket 172 may be configured to engage with ground engaging members 170 and to drive ground engaging members 170. In some examples, one or more idlers 174 and/or one or more rollers 178 may guide the tracks as the tracks rotate to propel machine 100.

As shown in FIG. 1, multiple IMUs 180 are installed at different positions on components or portions of machine 100. As an example, IMU 180-1 may be installed on chassis 104 and IMU 180-2 may be installed on front attachment 160. IMU 180-1 and IMU 180-2 may be collectively referred to as IMUs 180.

An IMU 180 includes one or more devices that are capable of receiving, generating, storing, processing, and/or providing signals that may be used to determine a position and orientation of a component, of machine 100, on which the IMU 180 is installed. For example, IMU 180 may include one or more accelerometers and/or one or more gyroscopes.

The one or more accelerometers and/or the one or more gyroscopes generate and provide signals that can be used to determine a position and orientation of the IMU 180 relative to a frame of reference and, accordingly, a position and orientation of the component. For example, IMU 180-1 may provide signals that may be used to determine a current position and orientation of chassis 104 relative to gravity (and/or relative to an axis orthogonal to gravity). For instance, IMU 180-1 may provide chassis roll data that may be used to determine a roll angle of chassis 104 relative to gravity. IMU 180-2 may provide signals that may be used to determine a current position and orientation of front attachment 160 of machine 100 relative to chassis 104. For instance, IMU 180-2 may provide implement roll data that may be used to determine a roll angle of front attachment 160 relative to chassis 104. While the example discussed herein refers to IMUs 180, the present disclosure is applicable to using one or more other types of sensor devices that may be used to determine a position and orientation of a component of machine 100 (e.g., with respect to gravity and/or with respect to another component of machine 100).

Velocity sensor device 182 may include one or more devices that sense a velocity of machine 100 (e.g., velocity of ground engaging members 170 or track speed) and generate machine velocity data indicating the velocity of machine 100 (or track speed). Low pass filter 184 may include one or more devices configured to filter changes to the roll angle of chassis 104 by passing gradual changes to the roll angle of chassis 104 (e.g., low frequency components) and removing (or discarding) abrupt/unexpected changes to the roll angle of chassis 104 (e.g., high frequency components). For example, low pass filter 184 may be configured to filter the changes to the roll angle of chassis 104 based on a mathematical combination of the machine velocity data and the desired change frequency (or cutoff frequency).

In some implementations, the desired change frequency may be mathematically combined with a value indicating a length of the machine prior to being combined with the velocity of machine 100. For example, the desired change frequency may be divided by the value indicating the length of machine 100. The desired change frequency and the value indicating the length of machine 100 may be combined using one or more different mathematical operations. Combining the desired change frequency with the value indicating the length of machine 100 may enable low pass filter 184 to account for machines of different sizes when filtering the changes to the roll angle of chassis 104.

In some situations, low pass filter 184 may be adjusted by a factor. In some situations, the factor may be based on an operation performed by machine 100. For example, the factor may be based on different types of earth moving applications performed by machine 100.

The gradual changes may be used to adjust a target roll angle of front attachment 160. Controller 140 may generate a command to adjust a roll angle of front attachment 160 based on the adjusted target roll angle, thereby enabling machine 100 to create a smooth surface for the terrain.

In some situations, machine 100 (e.g., controller 140) may be preconfigured with information identifying the desired change frequency. Additionally, or alternatively, the desired change frequency may be determined by an operator of machine 100. Additionally, or alternatively, machine 100 (e.g., controller 140) may receive the information identifying the desired change frequency from a device (e.g., associated with a cloud computing environment, associated with a back office system, among other examples).

While the foregoing example has been provided with respect to adjusting the target roll angle of front attachment 160 and adjusting a position of front attachment 160 (e.g., a current roll angle of front attachment 160), the examples described herein are applicable to adjusting a target roll angle and a position of rear attachment 150 and/or of other implements that may be connected to machine 100.

Sensor system 120, IMUs 180, velocity sensor device 182, and/or low pass filter 184 may provide signals periodically (e.g., every twenty milliseconds, every fifty milliseconds, among other examples). Additionally, or alternatively, sensor system 120, IMUs 180, velocity sensor device 182, and/or low pass filter 184 may provide signals based on a trigger (e.g., based on receiving a request from controller 140).

As indicated above, FIG. 1 is provided as an example. Other examples may differ from what was described in connection with FIG. 1.

Figure 2:
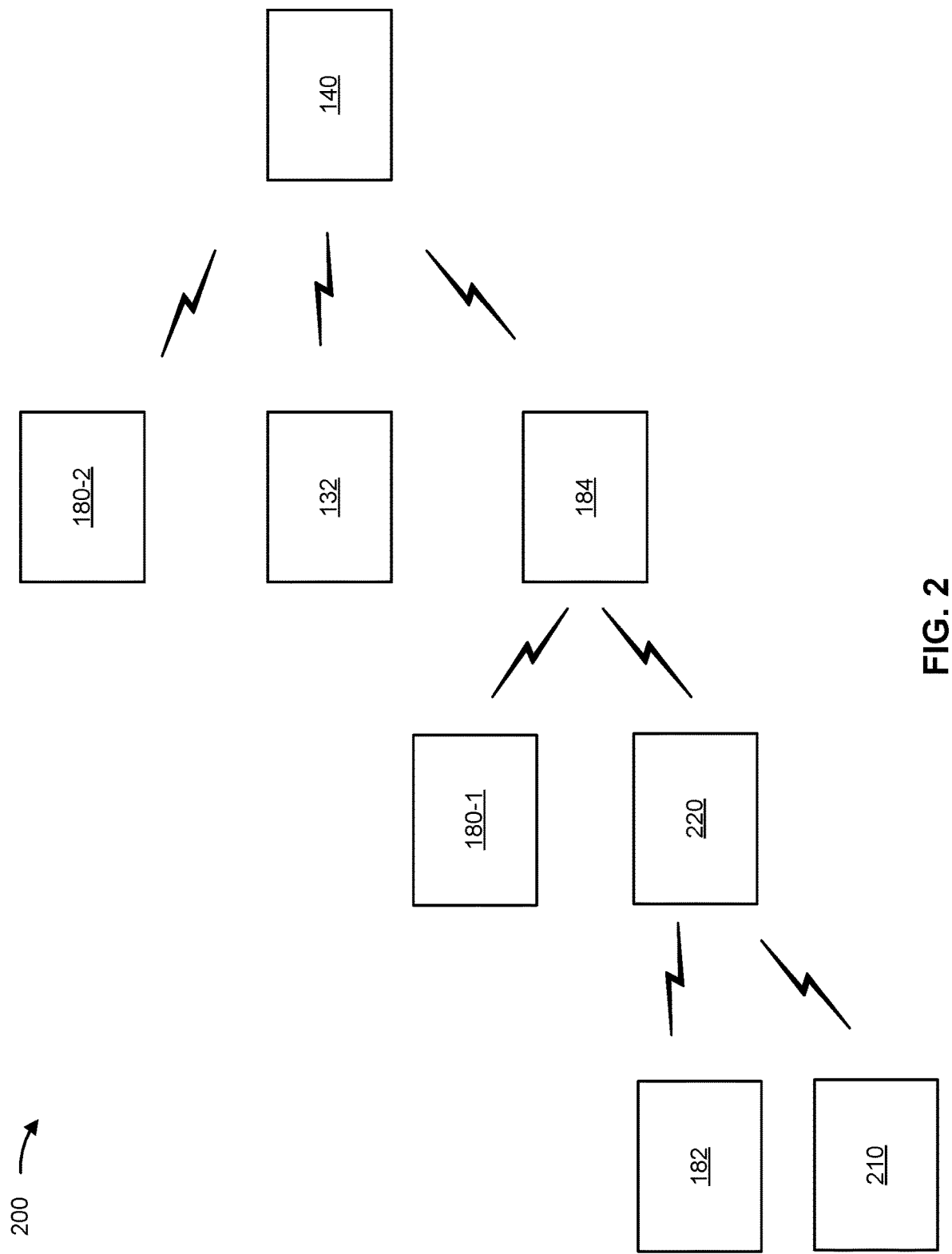
FIG. 2 is a diagram of an example system described herein.

FIG. 2 is a diagram of an example system 200 described herein. As shown in FIG. 2, system 200 includes operator controls 132, controller 140, IMUs 180, velocity sensor device 182, low pass filter 184, a desired frequency component 210, and a combining component 220. Some of the elements of FIG. 2 have been described above in connection with FIG. 1.

Desired frequency component 210 may include one or more devices that are configured to store and provide desired frequency data indicating the desired change frequency (or cutoff frequency). Desired frequency component 210 may provide the desired frequency data periodically and/or based on a trigger (e.g., based on a request from controller 140). In some examples, the desired frequency data may be in the form of cycles per millimeter (or some other unit of length). For instance, the desired frequency data may be a value in the distance domain.

Combining component 220 may include one or more devices that are configured to perform a mathematical operation on the desired frequency data and the machine velocity data. For example, combining component 22 may be configured to multiply the desired frequency data and the machine velocity data to obtain a combined value. In some examples, the combined value may be in the form of cycles per second (or some other unit of time). For instance, the combined value may be a value in the frequency domain.

Operator controls 132 may be configured to generate a command indicating the target roll angle, of front attachment 160 (an implement of machine 100), relative to chassis 104. For example, operator controls 132 may be configured to generate operator control data indicating the target roll angle (e.g., a roll angle, of the implement, desired by an operator of machine 100).

Controller 140 may include one or more processors and one or more memories. A processor may be implemented in hardware, firmware, and/or a combination of hardware and software. A processor may be capable of being programmed to perform a function. Memory may store information and/or instructions for use by a processor to perform the function. For example, when performing the function, controller 140 may adjust a target roll angle of the implement and/or generate a command to adjust a current roll angle of the implement.

In some examples, controller 140 and/or low pass filter 184 may be included in machine 100, as illustrated above in FIG. 1. Alternatively, controller 140 and/or low pass filter 184 may be included in a device external to machine 100. For instance, controller 140 and/or low pass filter 184 may be part of a back office system.

Controller 140 may receive the command generated by operator controls 132. For example, controller 140 may receive the operator controls data associated with the command and may determine the target roll angle of the implement based on the operator controls data associated with the command.

As explained above, IMU 180-1 may provide the chassis roll data that may be used to determine the roll angle of chassis 104. The chassis roll data may identify changes to the roll angle of chassis 104 over a period of time. The changes may be occurring over distances traveled by machine 100. For example, the changes may include a first change in the roll angle of chassis 104 occurring at a first velocity of machine 100, a second change in the roll angle of chassis 104 occurring at a second velocity of machine 100, and so on. The chassis roll data may be provided as an input to low pass filter 184. An additional input, provided to low pass filter 184, may be the combined value generated based on combining the desired frequency data and the machine velocity data, as described above. In some situations, the chassis roll data and the combined value may be used to determine a rate at which the changes, to the roll angle of chassis 104, are occurring.

In some examples, low pass filter 184 may be included in controller 140. Alternatively, low pass filter 184 may be separate from controller 140. Low pass filter 184 may process the chassis roll data and, based on processing the chassis roll data, detect a rate at which the changes to the roll angle of chassis 104 are occurring. Such rate may be referred to as a frequency associated with the changes.

Low pass filter 184 may be configured to filter the changes by discarding high frequency changes to the roll angle of chassis 104 (e.g., abrupt/unexpected changes) and passing low frequency changes to the roll angle of chassis 104 (e.g., gradual changes). In some situations, the high frequency changes satisfy a frequency threshold while the low frequency changes do not satisfy the frequency threshold. In other words, a rate of changes (associated with the high frequency changes) may satisfy a rate threshold while a rate of changes (associated with the low frequency changes) may not satisfy the rate threshold. In some situations, machine 100 (e.g., low pass filter 184) may be preconfigured with the frequency threshold and the rate threshold. Additionally, or alternatively, the frequency threshold and the rate threshold may be determined by the operator of machine 100. Additionally, or alternatively, machine 100 (e.g., controller 140) may receive the frequency threshold and the rate threshold from a device (e.g., associated with a cloud computing environment, associated with a back office system, among other examples).

Using the first change in the roll angle of chassis 104 and the second change in the roll angle of chassis 104 as examples, a rate associated with the first change may not satisfy the rate threshold and a rate associated with the second change may satisfy the rate threshold. In this regard, the first change may correspond to a low frequency change that does not satisfy the frequency threshold and the second change may correspond to a high frequency change that satisfies the frequency threshold. In other words, a first frequency associated with the first change does not satisfy the frequency threshold and a second frequency associated with the second change satisfies the frequency threshold. Accordingly, low pass filter 184 may be configured to discard the second change. Low pass filter 184 may provide, as an output, data regarding the first change.

Controller 140 may use the output of low pass filter 184 (e.g., the data regarding the first change in the roll angle of chassis 104) to adjust the target roll angle of the implement to generate an adjusted target roll angle of the implement. For example, controller 140 may adjust the target roll angle by a mathematical operation using a value of the target roll angle and a value of the first change in the roll angle of chassis 104. In some examples, the target roll angle may be adjusted by adding the value of the target roll angle and the value of the first change in the roll angle of chassis 104. For instance, controller 140 may detect that the first change is an increase of the roll angle of chassis 104 and controller 140 may increase the target roll angle by the value of the first change. Alternatively, controller 140 may detect that the first change is a decrease of the roll angle of chassis 104 and controller 140 may decrease the target roll angle by the value of the first change.

Controller 140 may determine whether to adjust a current roll angle of the implement with respect to chassis 104 based on the adjusted target roll angle of the implement. For example, controller 140 may determine the current roll angle of the implement with respect to chassis 104 based on the implement roll data received from IMU 180-2. In some examples, the implement roll data may indicate a roll angle of the implement with respect to gravity. In this regard, controller 140 may determine the current roll angle of the implement with respect to chassis 104 by comparing the roll angle of chassis 104 (with respect to gravity) and the roll angle of the implement (with respect to gravity).

Controller 140 may compare the current roll angle of the implement and the adjusted roll angle of the implement to determine whether the current roll angle of the implement is different than the adjusted target roll angle of the implement. Based on determining that the current roll angle of the implement is different than the adjusted target roll angle of the implement, controller 140 may adjust the current roll angle of the implement to the adjusted target roll angle of the implement.

For example, controller 140 may generate a command to increase the current roll angle of the implement based on detecting the increase of the roll angle of chassis 104, if the adjusted target roll angle exceeds the current roll angle of the implement. Alternatively, controller 140 may generate a command to decrease the current roll angle of the implement based on detecting the decrease of the roll angle of chassis 104, if the current roll angle of the implement exceeds the adjusted target roll angle.

In some situations, the command may be generated by a proportional-integral-derivative (PID) controller. The PID controller may be included in controller 140. Alternatively, the PID controller may be separate from controller 140. In some examples, the command may be a valve command that may be generated to cause a movement of the implement. The valve command may be used to control a flow of hydraulic fluid to cause a lateral movement of front attachment 160, thereby adjusting a current roll angle of front attachment 160.

While the foregoing example has been provided with respect to adjusting the target roll angle of front attachment 160 and adjusting a position of front attachment 160, the examples described herein are applicable to adjusting a target roll angle and a position of rear attachment 150 and/or of other implements that may be connected to machine 100.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example component may perform one or more functions described as being performed by another set of devices of the example component.

Figure 3:
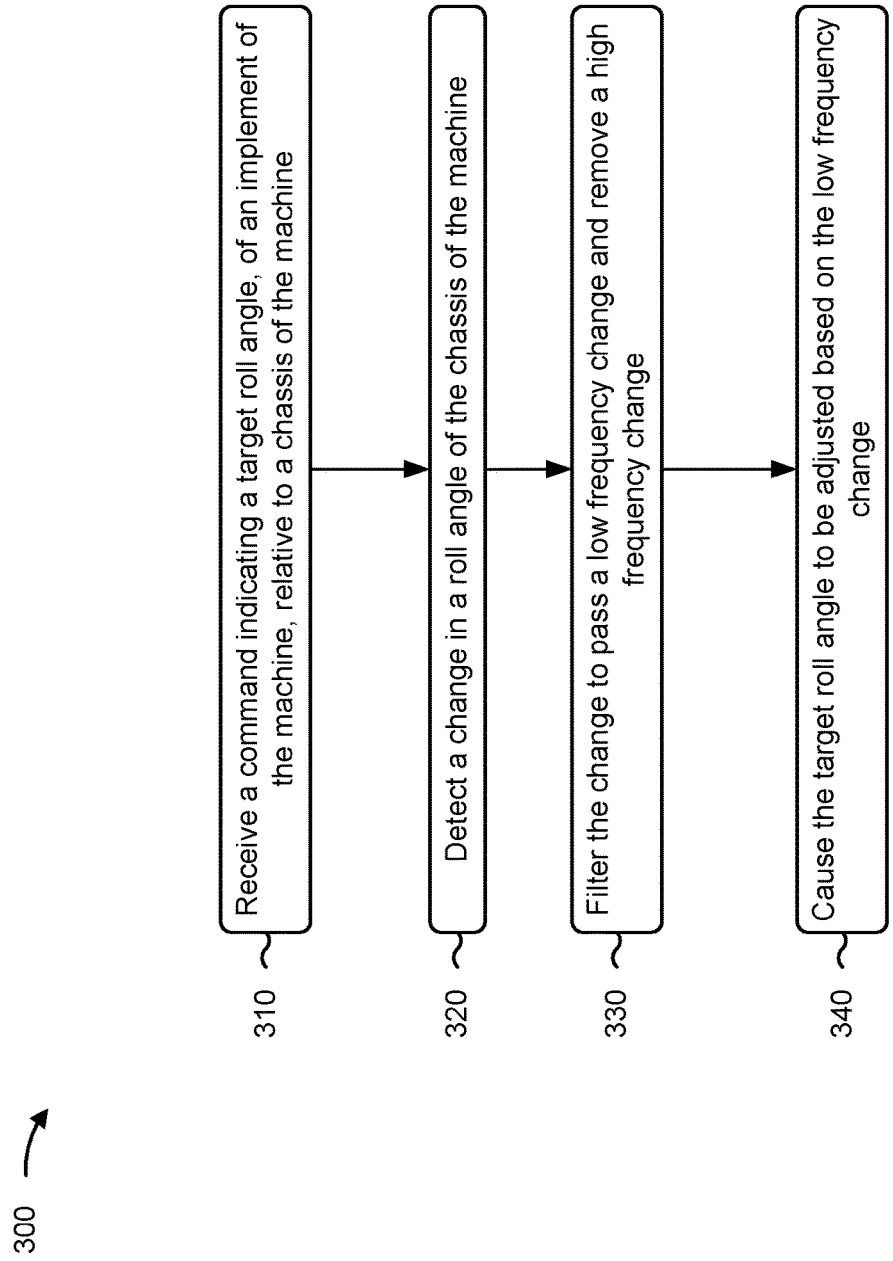
FIG. 3 is a flowchart of an example process relating to adjusting a position of an implement of a machine.

FIG. 3 is a flowchart of an example process 300 relating to adjusting a position of an implement of a machine. In some implementations, one or more process blocks of FIG. 3 may be performed by a controller (e.g., controller 140).

As shown in FIG. 3, process 300 may include receiving a command indicating a target roll angle, of an implement of the machine, relative to a chassis of the machine (block 310). For example, the controller may receive a command indicating a target roll angle, of an implement of the machine, relative to a chassis of the machine, as described above.

As further shown in FIG. 3, process 300 may include detecting a change in a roll angle of the chassis of the machine (block 320). For example, the controller may detect a change in a roll angle of the chassis of the machine.

In some implementations, detecting the change in the roll angle of the chassis comprises detecting an increase of the roll angle, and generating the command to adjust the current roll angle of the implement comprises generating a command to increase the current roll angle of the implement based on detecting the increase of the roll angle.

In some implementations, detecting the change in the roll angle of the chassis comprises detecting a decrease of the roll angle, and generating the command to adjust the current roll angle of the implement comprises generating a command to decrease the current roll angle of the implement based on detecting the decrease of the roll angle.

As further shown in FIG. 3, process 300 may include filtering the change to pass a low frequency change and remove a high frequency change (block 330). For example, the controller may filter the change to pass a low frequency change and remove a high frequency change, as described above.

As further shown in FIG. 3, process 300 may include causing the target roll angle to be adjusted based on the low frequency change (block 340). For example, the controller may cause the target roll angle to be adjusted based on the low frequency change, as described above.

In some implementations, causing the target roll angle to be adjusted comprises filtering the change based on a low pass filter. The low pass filter is configured to remove high frequency changes and pass low frequency changes. The low pass filter is configured to filter changes to the roll angle by removing changes, to the roll angle, associated with frequencies that satisfy the frequency threshold. The target roll angle is adjusted based on changes, to the roll angle, associated with frequencies that do not satisfy the frequency threshold. The controller is configured to filter the change using the low pass filter and machine velocity data indicating a velocity of the machine. The machine velocity data is received from a sensor device. The machine velocity data and the change are provided as input to the filter.

In some implementations, process 300 includes determining a current roll angle of the implement based on sensor data from a sensor device associated with the implement, determining that the current roll angle of the implement is different than the adjusted target roll angle, and adjusting the current roll angle of the implement to the adjusted target roll angle based on determining that the current roll angle of the implement is different than the adjusted target roll angle. The sensor device may be an IMU and the sensor data may include implement roll data indicating the current roll angle of the implement.

In some implementations, process 300 includes generating a command to adjust a current roll angle of the implement based on causing the target roll angle to be adjusted.

In some implementations, receiving the command indicating the target roll angle of the implement comprises receiving operator control data from an operator control associated with the machine, the operator control being configured to control a movement of the implement, and detecting the change in the roll angle of the chassis comprises detecting the change based on sensor data received from a sensor device associated with the chassis. The sensor device may be an IMU and the sensor data may include chassis roll data indicating the roll angle of the chassis.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

Some implementations described herein are directed to adjusting a roll angle of an implement of a machine based on filtering changes to a roll angle of a chassis of the machine. For example, unexpected changes (e.g., sudden changes) to the roll angle of the chassis may be discarded and gradual changes to the roll angle of the chassis may be used to adjust the roll angle of the implement of the machine. In some implementations, the changes to the roll angle of the chassis may be filtered using a low pass filter.

In some instances, the machine may travel on a terrain with an uneven surface. The uneven surface of the terrain may cause the roll angle of the chassis to abruptly change. An operator of the machine may desire to smooth out the surface of the terrain. Accordingly, the operator may adjust a position of the implement to account for abrupt movements of the chassis.

In some situations, the operator may not timely adjust the position of the implement to account for the abrupt lateral movements of the chassis. Alternatively, the operator may excessively adjust the position of the implement. Accordingly, the surface of the terrain may remain uneven and the operator may use the machine one or more additional times to attempt to smooth out the surface of the terrain. Using the machine in this manner is time consuming, causes premature wear of components of the machines, and/or consumes resources associated with using the dozer multiple times to create smoothen the surface of the terrain.

The low pass filter described herein may filter changes to the roll angle of the chassis by discarding unexpected changes to the roll angle of the chassis and by passing gradual changes to the roll angle of the chassis caused by gradual changes to the terrain. By adjusting the roll angle of the implement based on discarding the unexpected changes to the roll angle of the chassis and by using the gradual changes to the roll angle of the chassis as described herein, the machine may generate a smooth surface for the terrain. Accordingly, adjusting the roll angle of the implement as described herein may prevent premature wear of components of the machine and/or may preserve resources associated with using the dozer multiple times to smoothen the surface of the terrain.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A method performed by a controller of a machine, the method comprising:
    receiving a command indicating a target roll angle, of an implement of the machine, which is measured relative to a chassis of the machine;
    detecting a change in a roll angle of the chassis of the machine;
    filtering the change to pass a low frequency change and remove a high frequency change; and
    causing the target roll angle to be adjusted based on the low frequency change.
2. The method of claim 1, wherein filtering the change comprises:
    filtering the change based on a low pass filter,
    wherein the low pass filter is configured to remove high frequency changes and pass low frequency changes.
3. The method of claim 1, wherein receiving the command indicating the target roll angle of the implement comprises:
    receiving operator control data from an operator control associated with the machine, the operator control being configured to control a movement of the implement; and
    wherein detecting the change in the roll angle of the chassis comprises:
    detecting the change based on sensor data received from a sensor device associated with the chassis.
4. The method of claim 1, further comprising:
    determining a current roll angle of the implement based on sensor data from a sensor device associated with the implement;
    determining that the current roll angle of the implement is different than the adjusted target roll angle; and
    adjusting the current roll angle of the implement to the adjusted target roll angle based on determining that the current roll angle of the implement is different than the adjusted target roll angle.
5. A system comprising:
    a controller, associated with a machine, configured to:
    detect a change in a roll angle of a chassis of the machine;
    filter the change to pass a low frequency change and remove a high frequency change;
    adjust a target roll angle of an implement of the machine, which is measured relative to the chassis of the machine, based on filtering the change; and
    adjust a current roll angle of the implement based on adjusting the target roll angle.
6. The system of claim 5, wherein, to filter the change, the controller is configured to:
    filter the change using a low pass filter,
    wherein the low pass filter is configured to filter changes to the roll angle by removing changes, to the roll angle, that are high frequency changes, and
    wherein the target roll angle is adjusted based on changes, to the roll angle, that are low frequency changes.
7. The system of claim 6, wherein, to filter the change, the controller is configured to:
    filter the change using the low pass filter and machine velocity data indicating a velocity of the machine,
    wherein the machine velocity data is received from a sensor device, and
    wherein the machine velocity data and the change are provided as input to the filter.
8. The system of claim 6,
    wherein the controller is further configured to:
    determine the current roll angle of the implement based on sensor data from a sensor device associated with the implement;
    determine that the current roll angle of the implement is different than the adjusted target roll angle; and
    adjust the current roll angle of the implement to the adjusted target roll angle based on determining that the current roll angle of the implement is different than the adjusted target roll angle.
9. The system of claim 5, wherein, to detect the change, the controller is configured to:
    detect an increase of the roll angle; and
    wherein the controller is further configured to:
    increase the target roll angle of the implement based on detecting the increase of the roll angle of the chassis; and
    generate a command to increase the current roll angle based on increasing the target roll angle.
10. The system of claim 5, wherein, to detect the change, the controller is configured to:
    detect a decrease of the roll angle; and
    wherein the controller is further configured to:
    decrease the target roll angle of the implement based on detecting the decrease of the roll angle of the chassis; and
    generate a command to decrease the current roll angle of the implement based on decreasing the target roll angle.
11. The system of claim 5, wherein the controller is further configured to:
    receive operator control data from an operator control associated with the machine prior to detecting the change,
    wherein the operator control data indicates the target roll angle.

12. A machine comprising:
a chassis;
an implement associated with the chassis; and
a controller configured to:
receive a command indicating a target roll angle, of the implement, relative to the chassis,
detect a change in a roll angle of the chassis;
determine whether a frequency, associated with the change, satisfies a frequency threshold; and
selectively adjust the target roll angle of the implement or prevent the target roll angle from being adjusted based on determining whether the frequency satisfies the frequency threshold, the target roll angle being adjusted based on determining that the frequency does not satisfy the frequency threshold, and the target roll angle being prevented from being adjusted based on determining that the frequency satisfies the frequency threshold, the target roll angle measured relative to the chassis of the machine, and the target roll angle adjusted relative to the chassis of the machine.

13. The machine of claim 12, wherein the controller is configured to:
determine that the frequency does not satisfy the frequency threshold;
adjust the target roll angle based on determining that the frequency does not satisfy the frequency threshold; and
cause a position of the implement to be adjusted based on the adjusted target roll angle.

14. The machine of claim 13, wherein, to cause the position of the implement to be adjusted, the controller is configured to:
determine a current roll angle of the implement;
determine that the current roll angle is different than the adjusted target roll angle; and
adjust the current roll angle to the adjusted target roll angle based on determining that the current roll angle is different than the adjusted target roll angle.

15. The machine of claim 12, wherein, to selectively cause the target roll angle to be adjusted or prevent the target roll angle from being adjusted, the controller is configured to:
filter the change based on a low pass filter,
wherein the low pass filter is configured to filter changes to the roll angle by removing changes, to the roll angle, associated with frequencies that satisfy the frequency threshold, and
wherein the target roll angle is adjusted based on changes, to the roll angle, associated with frequencies that do not satisfy the frequency threshold.

16. The machine of claim 12, wherein the controller is configured to:
generate a command to increase a current roll angle of the implement based on detecting an increase of the roll angle.

17. The machine of claim 12, wherein the controller is configured to:
generate a command to decrease a current roll angle of the implement based on detecting a decrease of the roll angle.

18. The method of claim 1, wherein the filtering comprises filtering the low frequency change based on a velocity of the machine.

19. The method of claim 1, wherein the filtering comprises filtering the low frequency change based on a length of the machine and a velocity of the machine.

20. The method of claim 1, wherein the causing the target roll angle to be adjusted based on the low frequency change comprises moving the implement by an angle corresponding to the low frequency change, such that the target roll angle is measured and adjusted relative to the chassis.

* * * * *